(12) United States Patent
Cafuta

(10) Patent No.: US 8,443,698 B2
(45) Date of Patent: May 21, 2013

(54) ROTARY INDEXING TABLE

(75) Inventor: Stanislav Cafuta, Buchen-Hainstadt (DE)

(73) Assignee: Weiss GmbH Sondermaschinentechnik Buchen, ODW (DE)

( * ) Notice: Subject to any disclaimer, the term of this patent is extended or adjusted under 35 U.S.C. 154(b) by 362 days.

(21) Appl. No.: 12/783,253

(22) Filed: May 19, 2010

(65) Prior Publication Data

US 2011/0120265 A1    May 26, 2011

(30) Foreign Application Priority Data

May 28, 2009  (DE) .......................... 10 2009 023 079

(51) Int. Cl.
*B23Q 16/06*  (2006.01)
(52) U.S. Cl.
USPC .......................... 74/813 R; 74/825
(58) Field of Classification Search
USPC .... 74/813 R, 816, 820, 825, 813 C; 451/397, 451/398, 401, 403, 413, 411; 269/55, 63, 269/66, 229, 231
IPC ......................................................... B23Q 16/06
See application file for complete search history.

(56) References Cited

U.S. PATENT DOCUMENTS

| | | | | |
|---|---|---|---|---|
| 3,682,005 A | * | 8/1972 | Fantz | 74/58 |
| 3,772,961 A | * | 11/1973 | Siebert | 409/221 |
| 3,850,051 A | * | 11/1974 | Woltjen et al. | 74/821 |
| 4,015,487 A | * | 4/1977 | Pfister | 74/813 L |
| 5,598,749 A | * | 2/1997 | Goto | 74/820 |

FOREIGN PATENT DOCUMENTS

| | | |
|---|---|---|
| DE | 364 113 | 11/1922 |
| DE | 36 10 988 | 1/1987 |
| DE | 10 2006 061 310 | 7/2008 |
| DE | 10 2007 021 618 B3 | 9/2008 |
| GB | 890 116 A | 2/1962 |

OTHER PUBLICATIONS

Search Report of German Patent No. 10 2009 023 079.3 dated Mar. 17, 2010.
Translation of Search Report of German Patent No. 10 2009 023 079.3 dated Mar. 17, 2010.
European Search Report dated Jul. 28, 2010.
Translation of European Search Report dated Jul. 28, 2010.

* cited by examiner

*Primary Examiner* — Richard Ridley
*Assistant Examiner* — Thomas Diaz
(74) *Attorney, Agent, or Firm* — Amster Rothstein & Ebenstein LLP

(57) ABSTRACT

A rotary indexing table having a plate which has drivers engaging into a driving groove of a barrel cam is provided. The plate is drivable via a barrel cam to make a rotary movement about an axis of rotation which is in turn drivable by a motor to make a first rotary movement about its longitudinal axis. An additional drive element connected drive-wise to the barrel cam is provided which is coupled to the plate via at least one coupling element.

9 Claims, 3 Drawing Sheets

ROTARY INDEXING TABLE

Figure 1:
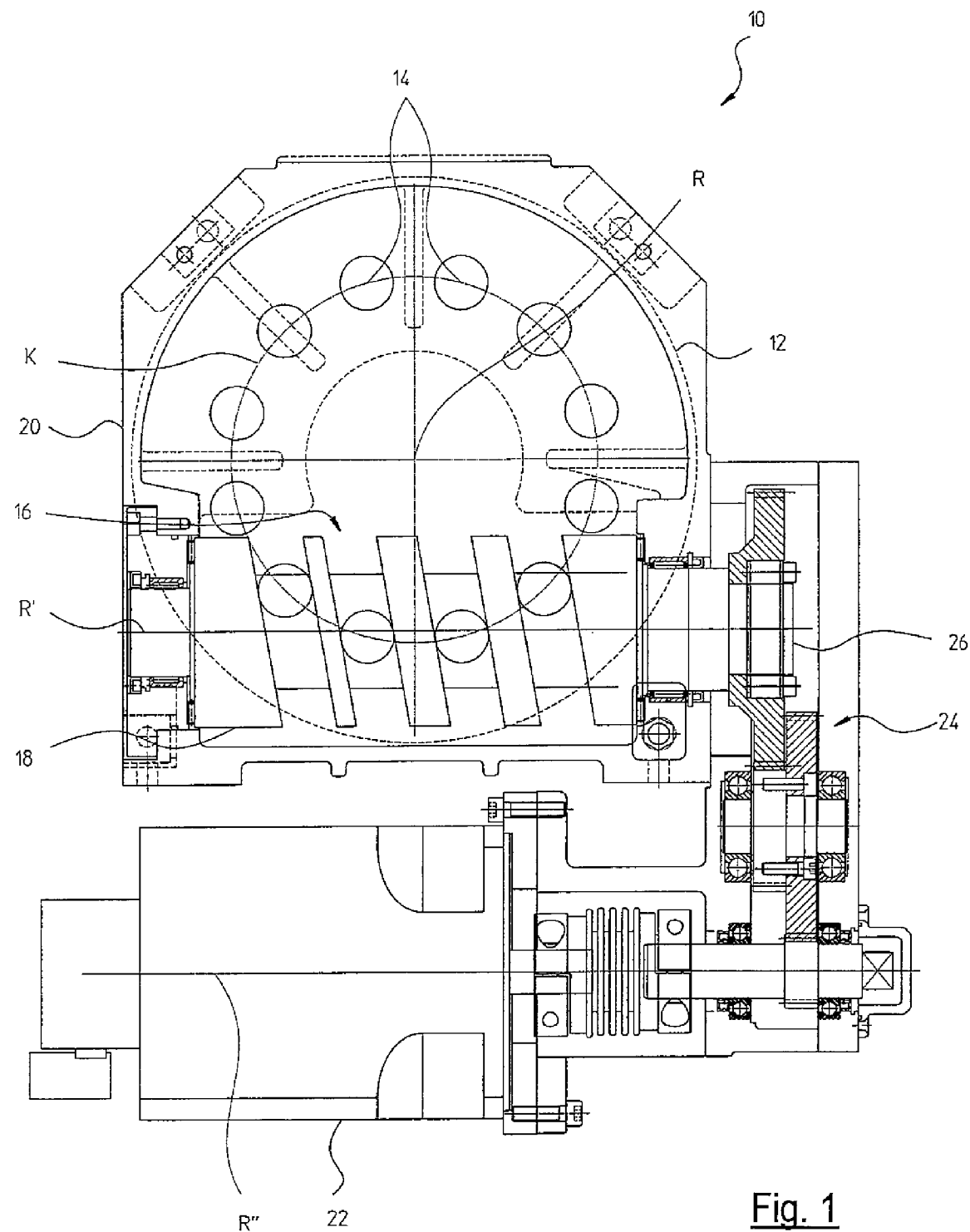

The present invention relates to a rotary indexing table having a plate which has drivers engaging into a driving groove of a barrel cam, with the plate being drivable via the barrel cam to make a rotary movement about an axis of rotation which is in turn drivable by a motor to make a rotary movement about its longitudinal axis.

Such rotary indexing tables, as are generally known in various embodiments from the prior art, serve, for example, to transport a plurality of workpieces held on the said plate or on structures arranged thereon in each case by a rotation of the plate from one work station or mounting station further to a next work station or mounting station. This transport usually—but not necessarily—takes place within the framework of a cyclic operation in which the plate is rotated by an angular measure with every cycle, said angular measure being able to correspond, for example, to the angular distance between two adjacent workpieces arranged on the plate.

With heavy workpieces, a substantial strain on the components of the rotary indexing table occurs which also has to be taken account by a corresponding design of the drive. One of the limiting factors of the power transmission of the drive is the coupling between the driving groove of the barrel cam and the drivers engaging into said driving groove. To provide rotary indexing tables which are of particularly high performance, a second drive unit, i.e. a second barrel cam having a separate motor associated with one of these barrels, is therefore usually provided. Such a rotary indexing table is known, for example, from DE 10 2007 021 681 B3.

It is an object of the invention to provide a rotary indexing table which can also reliably cope with high strains. The rotary indexing table should be inexpensive to manufacture.

This object is satisfied in accordance with the invention by a rotary indexing table having an additional drive element which is connected drive-wise to the barrel cam and which is coupled to the plate via at least one coupling element.

In other words, the plate is driven by the barrel cam via the additional drive element and the coupling element in addition to the driving force provided via the known driving groove/driver coupling. A second barrel cam to increase the driving force supplied to the plate is thus not necessary. The additional mechanical coupling path relieves the driving groove and the drivers of the plate, whereby their limited driving force transmission no longer presets the maximum strain of the rotary indexing table as a limiting factor. Wear phenomena of the driving groove and of the drives are additionally minimized.

The surprisingly simple idea underlying the invention thus provides a simply structured and therefore reliable rotary indexing table which does not require any additional electrical, and therefore expensive, drive elements to improve the drive of the plate.

An advantageous further development of the rotary indexing table in accordance with the invention provides that the coupling element includes a shaft section which is rotatably arranged coaxial to the axis of rotation of the plate. This shaft section can, for example, be a substantially tubular hollow cylinder.

The coupling element is in particular rotationally fixedly connected to the plate and/or to the additional drive element. Expensive transmission elements are thereby omitted, for example. Such a coupling is moreover in particular of particularly high performance and less prone to damage. It must be mentioned in this connection that the rotationally fixed connection can be configured directly or indirectly. A connection is to be understood by an indirection connection which provides one or more interposed elements between the named components.

Provision can be made that the axis of rotation of the plate and the axis of rotation of the additional drive element are arranged coaxial.

In accordance with a further advantageous embodiment, the additional drive element includes an additional plate which has drivers engaging into the driving groove or into an additional driving groove of the barrel cam.

The plate and the additional drive element are in particular arranged substantially in mirror-symmetry with respect to a plane of symmetry which in particular includes the axis of rotation of the barrel cam. Such a type of construction is particularly compact. In addition, substantially the same components can be used for the plate and for the additional drive elements as well as for the respective drivers associated with them, which has a positive effect on the manufacturing costs of the rotary indexing table. Asymmetrical types of construction are in particular recommended in applications in which the additional drive element and the plate have different tasks; for example, when the additional drive element is only provided for the provision of a further mechanical coupling path and for the improvement of the support, whereas the plate can also be equipped with workpieces in addition to the aforesaid tasks. Specific construction space requirements can likewise make an asymmetrical type of construction necessary.

A uniform strain on the drive components of the rotary indexing table results when the plate and the additional drive element can be driven with substantially equal force by the barrel cam.

In the position of use of the rotary indexing table, the axis of rotation of the plate and/or the axis of rotation of the additional drive element can be arranged substantially vertical. The workpieces to be machined then "lie" on the plate. In contrast to this, an alternative type of construction has substantially horizontally arranged axes of rotation of the plate and/or of the additional drive element. This allows a particularly efficient use of the rotary indexing table since both the plate and the additional drive element are easily accessible from the side and thus workpieces arranged thereat can be machined particularly easily at oppositely disposed sides of the rotary indexing table. The additional drive element of the "vertical" variant of the rotary indexing table can, however, also generally be equipped with workpieces, e.g. from below.

The plate and/or the additional drive element can be coupled to a respective one flange each for the holding of a workpiece. This, for example, allows a simple adaptation of the rotary indexing table to the workpieces to be machined since only the flange has to be replaced when another type of workpiece should be machined.

Advantageous embodiments of the invention are described in the description, in the dependent claims and in the drawings.

Figure 2:
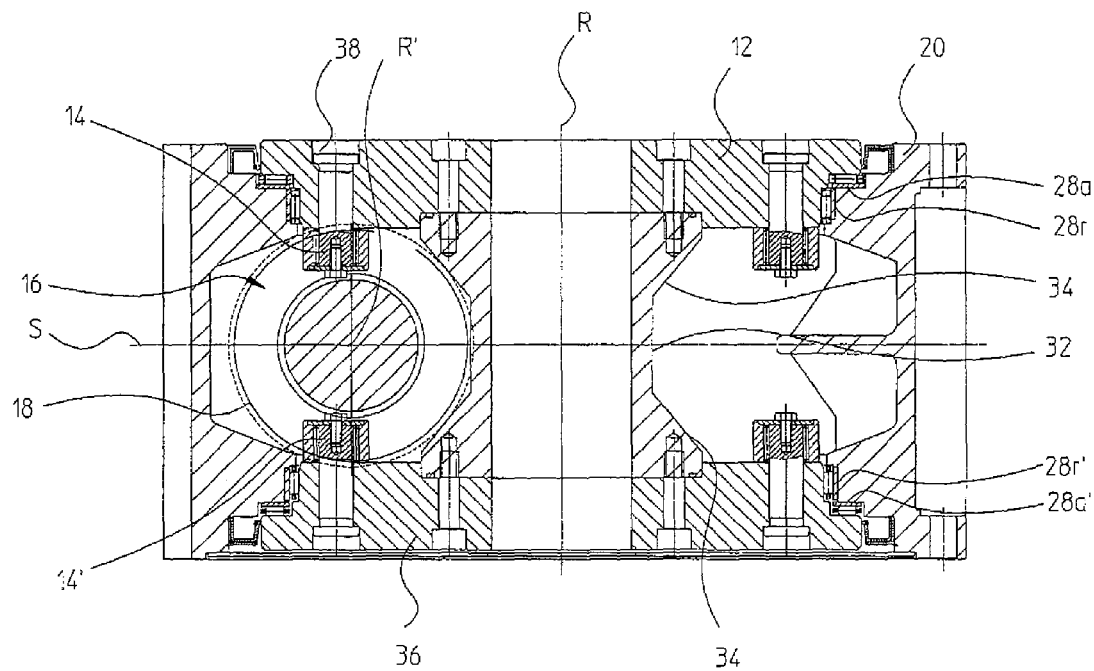
Figure 3:
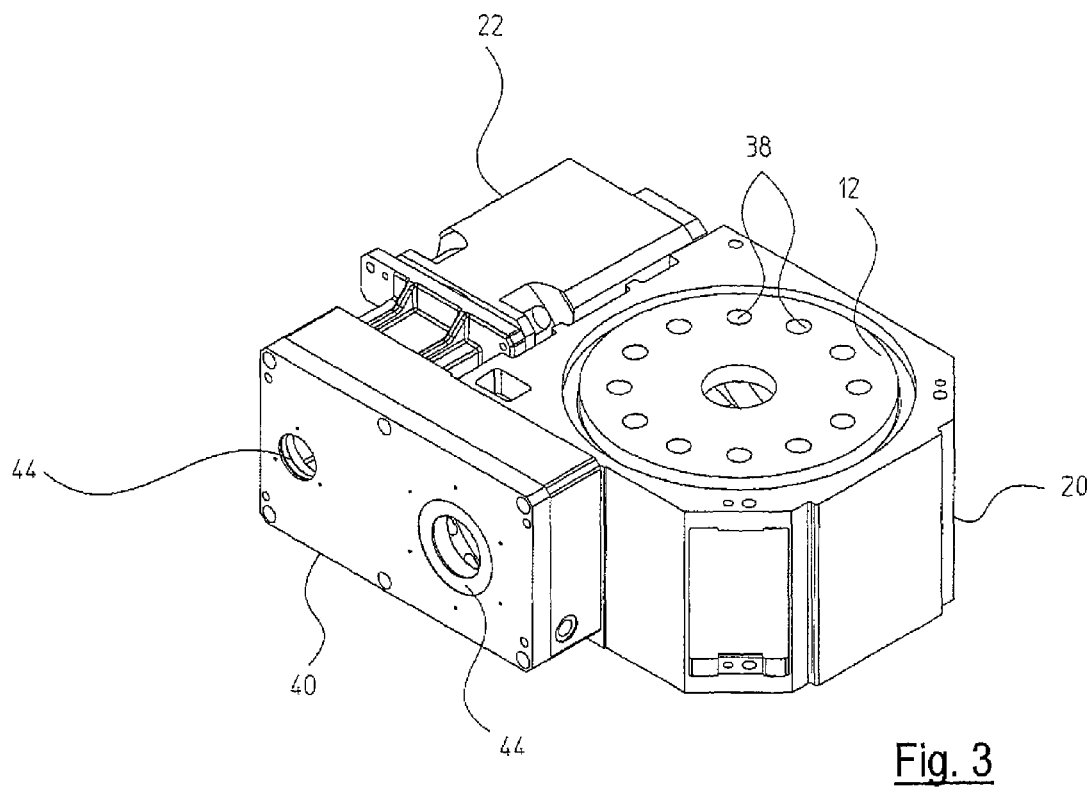

The invention will now be described in the following purely by way of example with reference to advantageous embodiments of the rotary indexing table in accordance with the invention and to the drawings. There are shown:

FIG. 1 a schematic representation of an embodiment of the rotary indexing table in accordance with the invention in a plan view;

FIG. 2 a cross-section through a part of the embodiment shown in FIG. 1;

FIG. 3 a perspective view of the embodiment shown in FIG. 1; and

Figure 4:
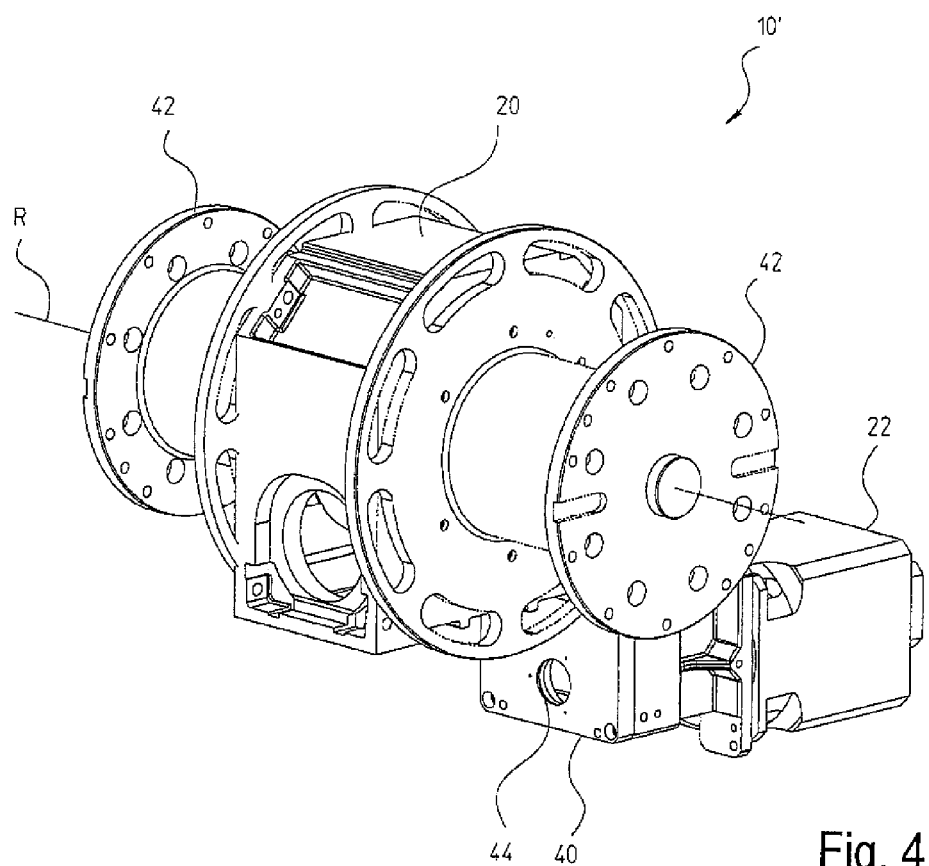
Figure 5:
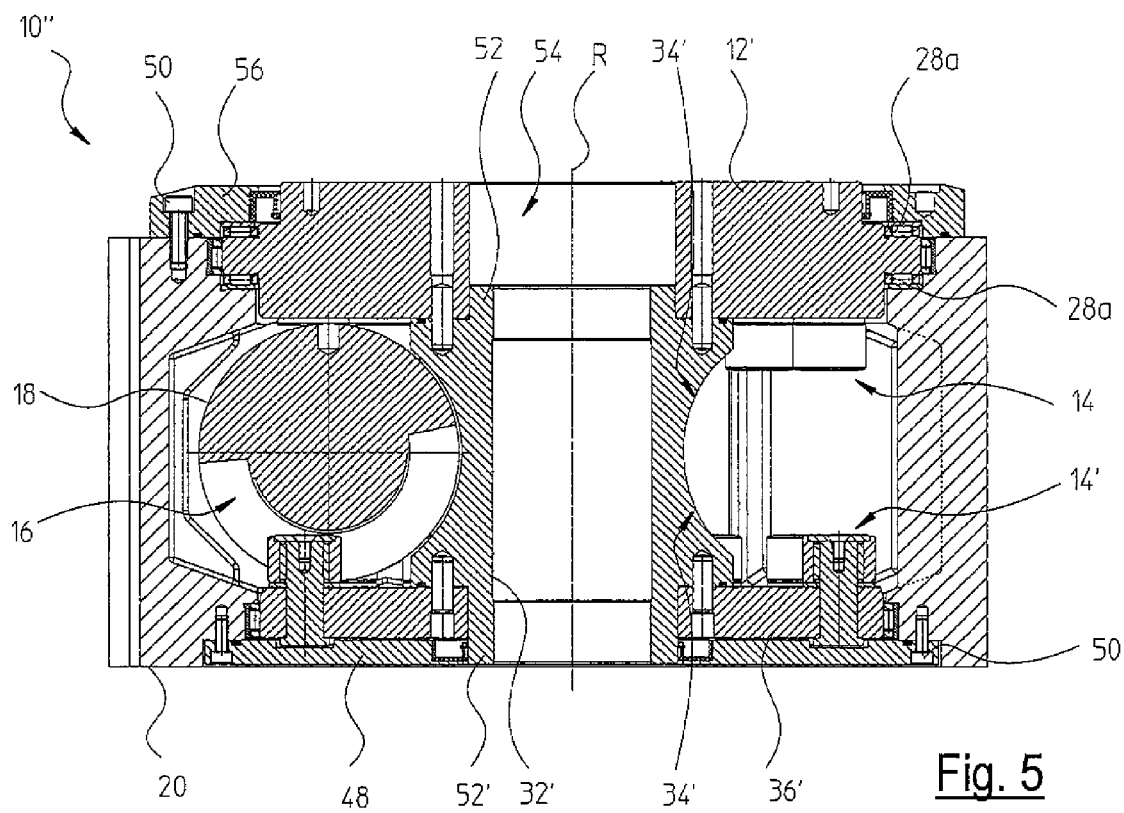

FIG. 4 a perspective view of a further embodiment of the rotary indexing table in accordance with the invention;

FIG. 5 a cross-section through a further embodiment of the rotary indexing table in accordance with the invention.

FIG. 1 shows a rotary indexing table 10 schematically in a plan view which has a rotatably supported plate 12 (indicated by a dashed line). The plate 12 is shown transparent in FIG. 1 in order not to cover drivers 14 arranged at its lower side. The drivers 14 are distributed uniformly in the peripheral direction of the plate 12 and lie on an imaginary circle K whose center lies on an axis of rotation R of the rotatably supported plate 12. The support of the plate 12 takes place by a housing 20 of the rotary indexing table 10, as will be explained in the following in more detail with reference to FIG. 2. The drivers 14 have a longitudinal extent running perpendicular to the plane of the drawing of FIG. 1 and thereby engage into a driving groove 16 of a barrel cam 18. The barrel cam 18 is rotatably supported about an axis of rotation R' in the housing 20 which also serves for the support of the plate 12.

To set the plate 12 into rotation, the barrel cam 18 is set into a rotary movement. The driving groove 16 running in spiral fashion around the barrel cam 18 takes along the drivers 14 on a rotation, whereby the plate 12 is in turn set into a rotary movement. This manner of drive of the plate 12 is generally known from the prior art. It is likewise known that the embodiment of the driving groove 16 together with the rotary driving movement of the plate 12 controls the rotary movement of the plate 12. In other words, the driving groove 16 can have regions with different or varying gradients, deviating from the embodiment shown. Latching regions of the driving groove 16 can also be provided which extend perpendicular to the axis of rotation R' in a plan view. With a suitable arrangement and number of drivers 14, a cyclic operation of the plate 12 can then be generated, for example, without changing the drive speed of the barrel cam 18. Such a drive can, however, also be realized with a constant gradient of the driving groove 16 by a correspondingly controlled drive of the barrel cam 18.

The drive of the barrel cam 18 takes place by an electric motor 22 whose axis of rotation R" is arranged parallel to the axis of rotation R' of the barrel cam 18. A driving torque generated by the motor 22 is transmitted in a manner known per se via a transmission 24—in the present case a spur gear—to a drive shaft 26 of the barrel cam 18, whereby the plate 12 is driven to make a rotary movement about the axis of rotation R in the manner described above. The axis of rotation R extends perpendicular to the axes of rotation R', R".

As initially explained, the coupling between the drivers 14 and the flanks of the driving groove 16 also represents a mechanically limiting factor for a reliable drive of the plate 12 with high strains. Specifically, this means that the left hand flank of the driving groove 16 running spirally around the barrel cam 18 is loaded when the plate 12 shown is driven to make a rotary movement in a counter clockwise manner. To reduce this strain and thus to improve the drive of the plate 12, an additional mechanical coupling path is provided between the barrel cam 18 and the plate 12, as is shown in FIG. 2.

FIG. 2 shows a perpendicular section through the plate 12, the barrel cam 18 and the housing 20. It can be recognized that the plate 12 is rotatably supported in the housing 20 by an axial bearing 28a and a radial bearing 28r.

As already described above, the plate 12 is provided with drivers 14. In the position of use of the plate 12 on which workpieces (not shown) to be machined—directly and/or indirectly—can be fastened, the drivers 14 are located at the lower side of the plate 12. They engage into the driving groove 16 of the barrel cam 18 in the manner described above.

The plate 12 is, however, not only driven via the coupling of the drivers 14 with the barrel cam 18. To provide a further mechanical coupling path between the barrel cam 18 and the plate 12, the plate is additionally rotationally fixedly connected to a coupling cylinder 32. The coupling cylinder 32 arranged coaxial to the plate 12 has a flange-like extension 34 at each of its end faces. The extension 34 at the upper end face in the position of use serves for the connection of the coupling cylinder to 32 to the plate 12. The coupling cylinder 32 is in rotationally fixed connection with an additional plate 36 via the extension 34 at the other—lower—end face of said coupling cylinder.

The additional plate 36 is connected drive-wise to the barrel cam 18 in an analog manner as the plate 12. The construction of the components associated with the additional plate 36—e.g. drivers 14', bearings 28a', 28r'—is identical to the corresponding components which are associated with the plate 12. Only the spatial arrangement differs due to the fact that the additional plate 36 cooperates with the barrel cam 18 "from below". The components are therefore arranged symmetrical to a plane of symmetry S which includes the axis of rotation R' of the barrel cam 18 and which stands perpendicular on the common axis of rotation R of the plates 12, 36. No separate driving groove 16 is associated with the drivers 14' of the additional plate 36, i.e. the drivers 14, 14' engage into the same driving groove 16. It is, however, by all means conceivable for specific applications that a separate driving groove is provided for the drivers 14' which can be a spiral groove offset in the axial direction parallel to the driving groove 16, for example. This offset must also be taken into account in the arrangement of the drivers 14' in this case, said drivers coinciding with the drivers 14 in a direction parallel to the axis of rotation R.

It is ensured in a simple manner by the symmetrical structure of the "classical" coupling path and of the "additional" coupling path between the barrel cam 18 and the plate 12—direct coupling between the barrel cam 18 and the plate 12, on the one hand, and indirect coupling of these two components via the additional plate 36 and the coupling cylinder 32, on the other hand—that the driving force is transmitted in substantially equal parts via the two coupling paths from the barrel cam 18 to the plate 12. This also means that the maximum stress acting selectively on the loaded flank of the driving groove 16 is halved in comparison with the corresponding strains which occur in a rotary indexing table which only has the direct coupling between the barrel cam 18 and the plate 12.

It is understood that the symmetrical embodiment of the plate 12 and of the additional plate 36 does not have to be provided in all cases. This embodiment is admittedly also advantageous with respect to the manufacturing costs since no additional components of a different constructional design are required for the provision of an additional mechanical coupling. However, the specific construction can be adapted to the respective present application profile. A coupling is, for example, conceivable via moving elements—for example gears—and/or via differently dimensioned components.

FIG. 3 shows a perspective representation of the rotary indexing table 10. The plate 12, which is supported in the housing 20, can be recognized at the right. Bores 38 can be recognized in the surface of the plate 12 which serve for the fastening of the drivers 14, as can also be seen from FIG. 2. The bores 38 can optionally also be provided for the direct or indirect fastening of workpieces. A plurality of different types of fastening can generally be used.

The housing 30 covers the barrel cam 18 which is substantially arranged completely in the interior of the housing 20. As can be seen in FIG. 1, a shaft section of the drive shaft 26 of the barrel cam 18 projects out of the housing 30. It is connected there to the transmission 24 which is surrounded by a transmission housing 40 in FIG. 3 and is therefore not visible. The transmission 24 is in turn in connected to the motor 22.

A further embodiment of the rotary indexing table 10' is shown in FIG. 4. In this respect, the housing 20 is arranged in a perpendicular position in the position of use so that the plate 12 and the additional plate 36 (both not visible) are likewise arranged in a respective perpendicular plane. The common axis of rotation R of the two plates 12, 36 substantially extends in a horizontal axis. Due to the vertical arrangement of housing/plates, the plates 12, 36 are easily accessible from both sides, i.e. both the plate 12 and the additional plate 36 can be provided with tools. In other words, twice the number of workpieces can be machined per unit of time using a rotary indexing table 10' in comparison with a conventional rotary indexing table.

In the rotary indexing table variant 10' shown in FIG. 4, a flange 42 is applied to each of the plates 12, 36. The flanges 42 serve for the fastening of workpieces and can be matched to the respective circumstances present.

FIG. 4 also shows inter alia, in addition to the special features of the rotary indexing table 10' described above, an arrangement of the motor 22 which differs from that of the rotary indexing table 10. With the rotary indexing table 10', the motor 22 and the housing 20 are not arranged on one side of the transmission 24 or of the transmission housing 40, but are rather arranged on oppositely disposed sides. The axis of rotation R'' of the motor is, however, still arranged parallel to the axis of rotation R' of the barrel cam 18 (not visible).

It is advantageous in this connection if the transmission 24 has a modular structure, i.e. if the transmission 24 can be brought into connection drive-wise with an input shaft or output shaft from both sides of the housing 40. For this purpose, the housing 40 has two openings 44 on both end faces (see also FIG. 3), one each for the input shaft and for the output shaft. Such a modular structure reduces the manufacturing costs and expands the flexibility of use of the rotary indexing table in accordance with the invention since a conversion between the embodiments 10, 10' can take place in a simple manner, for example. A replacement of the transmission 24 is namely not required for this purpose.

FIG. 5 shows a perpendicular section through a further embodiment of the rotary indexing table 10''. In this embodiment—contrary to the embodiment shown in FIG. 2—the "classical" coupling path and the "additional" mechanical coupling path do not have a symmetrical structure. The plate 12' and the additional plate 36' of the rotary indexing table 10'' are admittedly driven via drivers 14 and 14' respectively in the manner described above. However, the two embodiments differ from one another inter alia by the support of the plates 12, 36 or 12', 36' respectively. The plate 12' of the rotary indexing table 10' is supported by two axial bearings 28a and one radial bearing 28r, whereas the additional plate 36' is only guided in its rotary movement by a radial bearing 28r'. To simplify assembly, one of the axial bearings 28a is associated with a ring element 56 which is connected to the housing 20 by bolts 50.

The axial support of the elements rigidly connected to one another of plate 12', coupling cylinder 32' and additional plate 36' is substantially provided by the plate 12' due to the arrangement of the bearings 28a, 28r, 28r' described above. The additional plate 36' has a supporting effect on the support in the radial direction.

The additional plate 36' is made in much less solidly a manner than the plate 12' since it is not provided for an equipping with workpieces as standard. A cover plate 48 is fixedly connected to the housing 20 by bolts 50 and screens the additional plate 36' from the environment, for example to prevent the penetration of dirt.

The asymmetrical form of the rotary indexing table 10'' is also reflected in the design of the coupling cylinder 32'. The coupling cylinder 32' has—similar to the coupling cylinder 32 of the rotary indexing table 10—extensions 34' which serve for the fastening of the plate 12' and of the additional plate 36' and whose shape is oriented to the contour of the barrel cam 18 to provide the greatest possible stability with simultaneous optimization of the construction space. An axial prolongation 52' of the coupling cylinder 32', however, passes through the additional plate 36' in the axial direction, while a corresponding axial prolongation 52 only partly penetrates into a central opening 54 of the plate 12'.

REFERENCE NUMERAL LIST 10, 10' rotary indexing table
12, 12' plate
14, 14' driver
16 driving groove
18 barrel cam
20 housing
22 electric motor
24 transmission
26 drive shaft
28a, 28a' axial bearing
28r, 28r' radial bearing
32, 32' coupling cylinder
34, 34' extension
36, 36' additional plate
38 bore
40 transmission housing
42 flange
44 opening
48 cover plate
50 bolt
52, 52' axial prolongation
54 central opening
56 ring element
R, R', R'' axis of rotation
K circle
S plane of symmetry

The invention claimed is:

1. A rotary indexing table having a plate (12, 12') which has drivers (14) engaging into a driving groove (16) of a barrel cam (18), wherein the plate (12, 12') is drivable via the barrel cam (18) to make a rotary movement about an axis of rotation (R), the barrel cam in turn drivable by a motor (22) to make a rotary movement about its longitudinal axis (R'),
wherein an additional drive element (36, 36') is provided which is connected drive-wise to the barrel cam (18) and which is coupled to the plate (12, 12') via at least one coupling element (32, 32'), and
wherein the additional drive element includes an additional plate (36, 36') which has drivers (14') engaging into the driving groove (16) or into an additional driving groove of the barrel cam (18).

2. A rotary indexing table in accordance with claim 1, characterized in that the coupling element (32, 32') includes a shaft section which is rotatably arranged coaxial to the axis of rotation (R) of the plate (12, 12').

3. A rotary indexing table in accordance with claim 1, characterized in that the coupling element (32, 32') is rotationally fixedly connected to the plate (12, 12') and/or to the additional drive element (36, 36').

4. A rotary indexing table in accordance with claim 1, characterized in that the plate (12, 12') and the additional drive element (36, 36') have a common axis of rotation.

5. A rotary indexing table in accordance with claim 1, characterized in that the plate (12) and the additional driving element (36) are arranged in substantially mirror symmetry with respect to a plane of symmetry (S) which includes the axis of rotation (R') of the barrel cam (18).

6. A rotary indexing table in accordance with claim 1, characterized in that the plate (12, 12') and the additional drive element (36, 36') can be driven substantially equally powerfully by the barrel cam (18).

7. A rotary indexing table in accordance with claim 1, characterized in that the axis of rotation (R) of the plate (12, 12') and/or an axis of rotation (R) of the additional drive element (36, 36') is/are arranged substantially vertical in the position of use of the rotary indexing table.

8. A rotary indexing table in accordance with claim 1, characterized in that the axis of rotation (R) of the plate (12, 12') and/or an axis of rotation (R) of the additional drive element (36, 36') is/are arranged substantially horizontal in the position of use of the rotary indexing table.

9. A rotary indexing table in accordance with claim 1, characterized in that the plate (12) and/or the additional drive element (36) is/are coupled to a respective one flange (42) each for the holding of a workpiece.

\* \* \* \* \*